United States Patent [19]

Adell

[11] Patent Number: 4,773,184

[45] Date of Patent: Sep. 27, 1988

[54] NON-METALLIC DOOR EDGE GUARD HAVING DIFFERENT APPEARANCES OF EACH SIDE

[76] Inventor: Robert Adell, 200 Adell Blvd., Sunnyvale, Tex. 75182

[21] Appl. No.: 57,606

[22] Filed: Jun. 3, 1987

[51] Int. Cl.⁴ .............................................. E05F 7/00
[52] U.S. Cl. ...................................... 49/46.2; 52/716
[58] Field of Search .................... 49/462; 52/716, 717

[56] References Cited

U.S. PATENT DOCUMENTS

| | | | |
|---|---|---|---|
| 3,494,075 | 2/1970 | Kunevicius | 49/462 |
| 3,547,515 | 12/1970 | Shanok et al. | 49/462 X |
| 3,706,173 | 12/1972 | Taylor | 49/462 X |
| 4,372,083 | 2/1983 | Hatzikeus et al. | 49/462 |

Primary Examiner—Philip C. Kannan
Attorney, Agent, or Firm—Rhodes and Boller

[57] ABSTRACT

A non-metallic door edge guard having notch structure at the center of the exterior surface of the base and a layer of material extending from the notch structure around the base and onto the exterior of one leg so that this leg presents an exterior appearance different from that of the other leg.

10 Claims, 2 Drawing Sheets

NON-METALLIC DOOR EDGE GUARD HAVING DIFFERENT APPEARANCES OF EACH SIDE

REFERENCE TO A RELATED APPLICATION

This application is related to the Applicant's pending application Ser. No. 004,658, filed January 20, 1987, "Non-Metallic Door Edge Guard", and the disclosure thereof is incorporated herein by reference.

BACKGROUND AND SUMMARY OF THE INVENTION

This mechanical invention relates generally to edge guards, and more particularly it relates to novel non-metallic edge guards, for use such as on the trailing edge of swinging closures.

Edge guards are used as protective and decorative articles on the edges of objects. In the case of a swinging closure of an automotive vehicle such as an automobile door, an edge guard which is applied to the trailing edge of the swinging closure can provide not only decoration, but also protection when the trailing edge is swung against an object. The edge guard can provide protection not only for the trailing edge of the swinging closure, but also for an object which may be struck by the trailing edge of the swinging closure. That is not to say that an edge guard can protect and withstand substantial impacts, but edge guards are useful in preventing chipping, knicking, scratching and like damage which typically arises in regular everyday use of an automobile, for example the opening and closing of a car's doors in a confined space such as in a crowded parking lot.

Applicant is the inventor of many edge guard improvements over the years. These improvements are the subjects of many patents. For the most part, these patented improvements relate to metallic edge guards, or insulated metallic edge guards. Metal possesses superior decorative and functional characteristics, and the insulated metallic edge guards advantageously combine the benefits of metallic and non-metallic components.

Although Applicant continues to prefer the insulated metallic type of edge guard for automotive use because of the combination of benefits which it provides, he has discovered novel ways to improve upon non-metallic edge guards which can be useful for certain applications. Certain of these improvements in non-metallic edge guards are the subject of this patent application.

Non-metallic edge guards are not broadly new. Examples exist in prior patents such as U.S. Pat. Nos. 3,547,516 and 4,372,083. While these prior non-metallic edge guards claim to possess certain beneficial characteristics, the truth of the matter is that in practice they are difficult to install, especially on contoured edges, and once installed, they may not retain satisfactorily over the life of the automobile.

The non-metallic edge guard which is the subject of the present invention is constructed and arranged to possess two different exterior surface appearance features, one to one side of the midpoint of the base and the other to the other side, so that a common transverse section for an edge guard can be used on symmetrically opposite doors to present the same exterior appearance feature for both doors, with the particular exterior surface feature presented being one or the other of the two different appearance features.

The invention is embodied in a U-shaped non-metallic edge guard which is fabricated of extruded plastic and provided with a notch structure which is centrally disposed in the exterior surface of the base of the edge guard.

In one embodiment of the invention, the plastic body itself presents the exterior appearance for the edge guard to one side of this notch structure, extending along the exterior surface of the base and at least onto the exterior of one leg; to the other side of the notch structure, an insert is applied to the exterior surface of the edge guard, extending along the base from the notch and at least onto the exterior of the other leg, and this insert presents a different exterior appearance from that presented to the other side of the notch. Preferably the two legs are of the same length, but they can be different since the transition from one appearance region to the other is at the mid-point of the base.

In another embodiment, two inserts are applied to the exterior surface of the edge guard on opposite sides of the notch structure. The cooperative effect of each insert with the corresponding side of the edge guard is such that the exterior surface appearance presented by one side is different from that presented by the other side. This difference in appearance may be presented by making the inserts different in color and/or size and/or by having the legs of different length. Yet in all embodiments of the invention a common transverse cross section of edge guard presents the same exterior appearance on symmetrically opposite vehicle doors, with the particular appearance presented being either of two possible appearances.

The foregoing features, advantages, and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
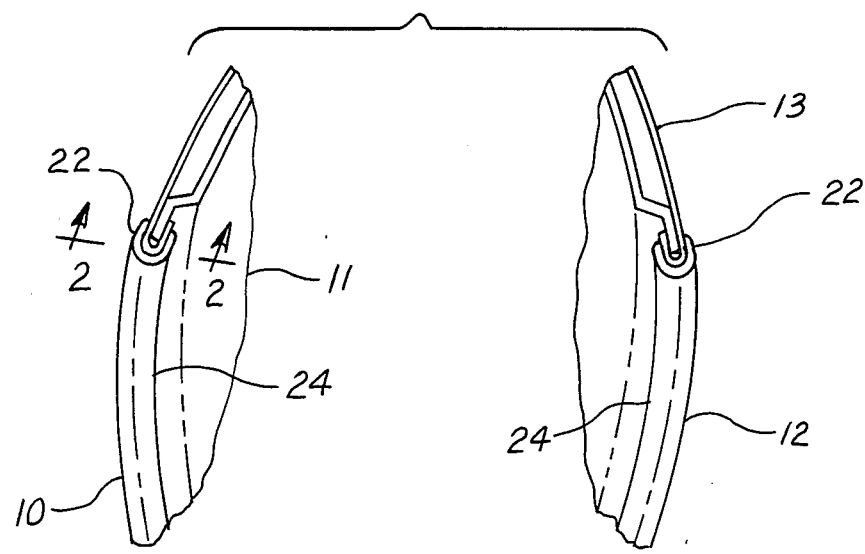
FIG. 1 is a fragmentary perspective view illustrating door edge guards applied to the trailing edges of symmetrically opposite doors.

FIG. 1 shows one non-metallic door edge guard 10 of the present invention installed on the trailing edge of the left front door 11 of an automobile and another edge guard 12 on the trailing edge of the right front door 13. Each edge guard is an elongate strip of non-metallic material and in transverse cross section has a general U-shape.

The general U-shape of edge guard 10 comprises a generally semi-circular base 20 from opposite ends of which project legs 22, 24. Leg 22 is the outer leg and is disposed against the exterior of the door trailing edge. Leg 24 is the inner leg and is disposed against the interior of the door trailing edge. Base 20 is of reduced thickness from the legs and wraps around the end of the door edge. Preferably the entire interior of the edge guard is disposed against the door with the edge guard being attached by any of the attachment means described in the above referenced application.

In according with principles of the present invention, the edge guard comprises a notch structure 26 located in it's exterior surface at the midpoint of base 20. A layer of material 28 is applied to the edge guard in a cooperative association with notch structure 26. The layer of material 28 is applied to the exterior surface of the edge guard extending from the notch structure to one side of the edge guard, along the exterior surface of the base and at least onto the exterior of the leg 22. In the FIG. 2 embodiment, the entire exterior surface of leg 22 is covered by the layer of material 28 and, in fact, the layer extends around the distal end of leg 22 and has a cooperative association with a further notch structure 30 on the interior surface of the outer leg immediately adjacent the distal end.

Figure 2:
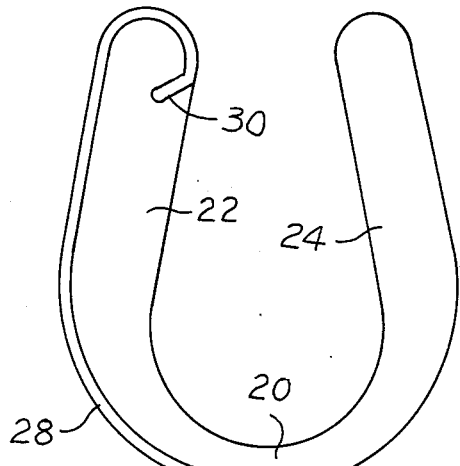
FIG. 2 is a transverse cross sectional view taken in the direction of arrows 2—2 in FIG. 1 and on an enlarged scale but showing the edge guard by itself prior to installation on the edge.

In the FIG. 2 embodiment, the exterior surface of the inner leg presents an appearance of that of the material of the edge guard body itself. Where the edge guard body material is a colored plastic such as colored PVC, the color of the plastic is the exterior appearance which is presented.

The exterior appearance presented by the outer leg is that of the insert where the insert is other than strictly transparent. If the insert were strictly transparent, the color of the edge guard material would be seen through it. A metallic appearance may be imparted to the edge guard by constructing the layer of material as a thin metal foil which is encapsulated in a transparent material such as mylar. Details of such a mylar encapsulated foil and its attachment to the edge guard body are described in more detail in the above referenced application.

The illustrated cross section in FIG. 2 shows the inner and outer legs to be convergent toward each other. This represents the condition as manufactured. When the edge guard is applied to the trailing edge, the legs are spread further apart to a more parallel condition and the edge guard is attached to the edge of the door by any of the means described in the referenced patent application.

It is to be observed that in the illustrated installation of FIG. 1, the exterior appearance presented by the edge guard when the left door is viewed by an observer at the side of the automobile, is a metallic appearance simulating bright, shiny metal such as chrome.

Because of the symmetrical nature of the edge guard, the same edge guard may be used on the right door so that the same bright appearance is presented. The outer leg 22 is still the outer leg on both edges and the inner leg is still the inner leg.

The edge guard possesses the ability for presenting other than the metallic appearance, if that is desired. By reversing each of the two edge guards such that the inner leg becomes the outer leg and the outer leg the inner leg, the particular coloration of the edge guard body can be presented. This coloration may complement or contrast with the color of the automobile paint.

Notch 26 is an undercut whose depth is essentially that of the thickness of the layer of material 28 so that at the midpoint of the base the layer of material is essentially flush where it fits into the notch. Although the two legs are shown of the same length, they can be different since the transition of one appearance region to the other is at the midpoint of the base.

Figure 3:
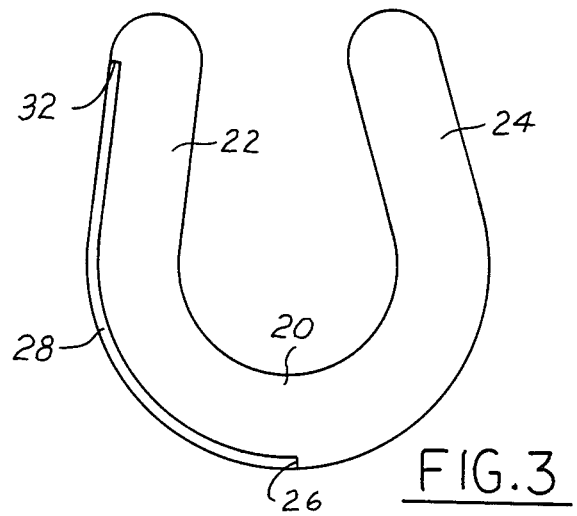

FIG. 3 illustrates another embodiment which retains the notch structure 2 at the midpoint of the base but which presents a further form of exterior appearance for what has been referred to as the outer leg. In FIG. the notch 30 is omitted and replaced by a notch 32 which is spaced a short distance from the distal end of the outer leg on the exterior surface. The depth of notch 32 is preferably the same as notch 26 and as the thickness of the insert which now extends between the two notches. In this embodiment a metallic appearance is presented by the outer leg except at the extreme distal end which presents the coloration of the edge guard body material. When the outer leg installed on the vehicle as viewed from the side, it would present substantially the appearance of bright, shiny metal except for a thin band which is the color of the body of the edge guard at the extreme distal end of the leg.

Figure 4:
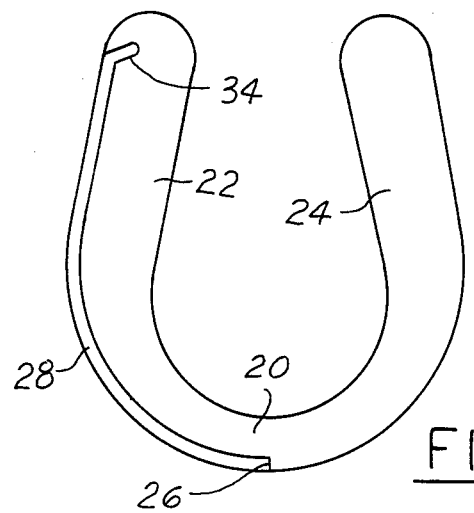

FIG. 4 illustrates a further embodiment which would present the same exterior appearance for the outer leg as the FIG. 3 embodiment. In this embodiment the notch structure adjacent the distal end of the leg is in the form of a slot 4 which extends into the leg in the manner shown.

Figure 5:
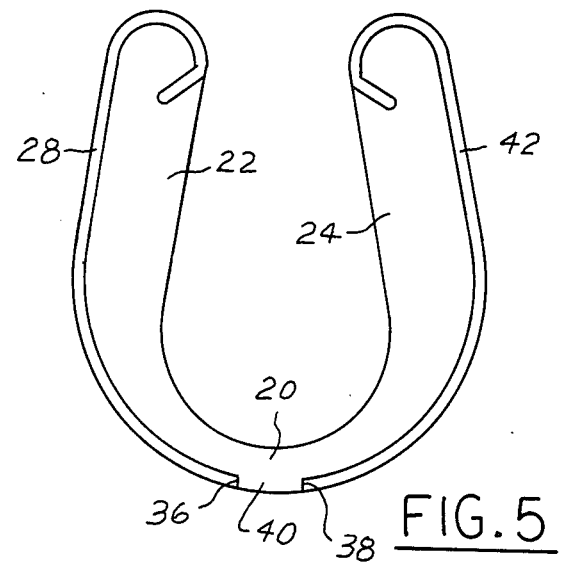
FIGS. 3-7 are views similar to FIG. 2 of further embodiments.

FIG. 5 illustrates another embodiment of the invention in which the notch structure is still located at the midpoint of the exterior of the base but comprises a pair of notches 36, 38 on opposite sides of a protuberance 40. To one side the body of the edge guard is covered by an insert 28 in the same manner as in FIG. 2. To the other side there is a second insert 42 applied to the inner leg in symmetrical manner to the application of the other insert to the outer leg. Assuming that both inserts are of other than merely transparent material, the exterior appearance presented by one leg is that of the one insert while the exterior appearance presented by the other leg is that of the other insert. The two inserts would, however, present different appearances to respective sides of the edge guard.

Figure 6:
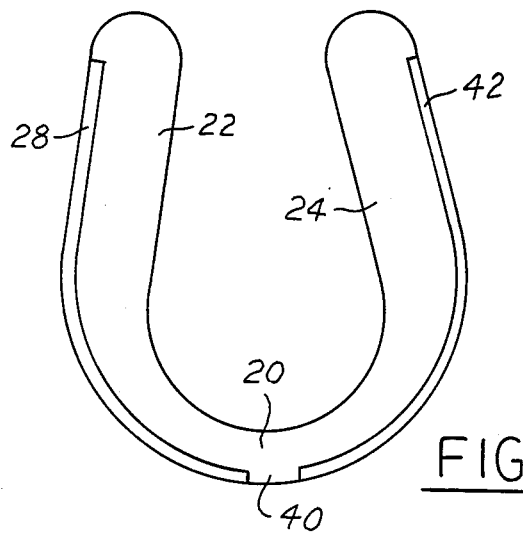
Figure 7:
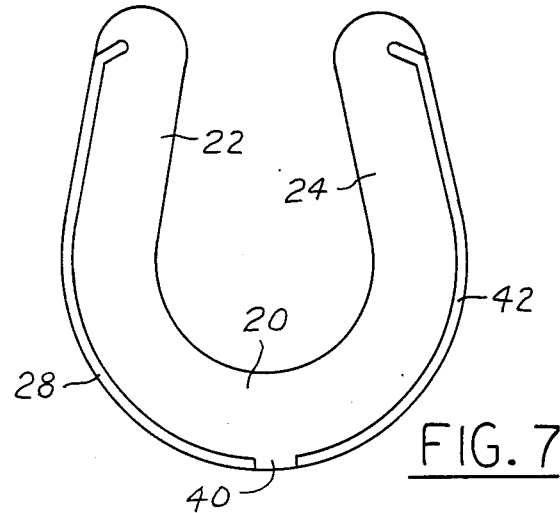

FIGS. 6 and 7 illustrate further embodiments similar to FIG. 5 insofar as the notch structure at the base is concerned but which embody the inserts in the manners of FIGS. 3 and 4 respectively. In view of the preceding description, a detailed description of FIGS. 6 and 7 is not required.

Figure 8:
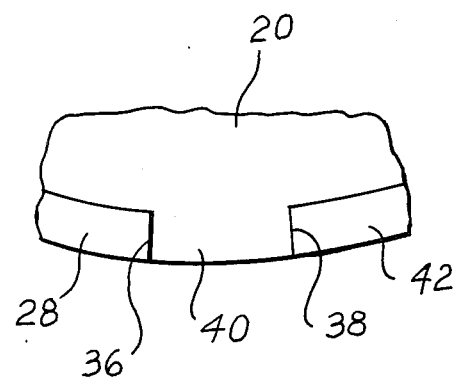
FIG. 8 is an enlarged fragmentary view illustrating a modification.

FIG. 8 illustrates a modified form in which the width of the protuberance 40 at the midpoint of the base is slightly larger from that shown in FIGS. 5, 6 and 7.

A multitude of different exterior appearances may be embodied in an edge guard according to principles of the invention. The insert or inserts applied to the body of the edge guard could be simply colored material. They could also be reflective material or material which has particular designs. The body of the edge guard can be of different materials, colored, or transparent depending upon particular material used.

While a preferred embodiment of the invention has been disclosed, it will be appreciated that principles are applicable to other embodiments.

What is claimed is:

1. In combination with the trailing edge of a swinging closure, the improvement in a decorative and protective edge guard fitted onto the trailing edge of the swinging closure, comprising a non-metallic body having a curved base fitting over the edge and legs extending from the base to fit against sides of the swinging closure adjacent the edge, said body containing notch structure disposed at its exterior surface at the center of said base, a layer of non-metallic material cooperatively joined to the exterior surface of said body, said layer extending from said notch structure along said base and at least an adjoining portion of one of the legs; and said layer presenting a different exterior appearance from that presented by the other of the legs.

2. The improvement set forth in claim 1 in which the exterior appearance presented by said other leg is that of said non-metallic body.

3. The improvement set forth in claim 1 in which said notch structure comprises an undercut at the center of the base.

4. The improvement set forth in claim 1 in which said layer comprises a transparent non-metallic material encapsulating a metallic foil.

5. The improvement set forth in claim 1 in which said notch structure is defined by a protuberance at the center of said base, said layer extending from one side of said protuberance, and including another layer of material cooperatively joined to the exterior surface of said body, said another layer extending from the other side of said notch structure along said base and at least an adjoining portion of the other of the legs, and the cooperative effect of said another layer and other leg presenting a different exterior appearance from that presented by the first-mentioned layer and one leg.

6. For use on the trailing edge of a swinging closure, the improvement in a decorative and protective edge guard for fitting onto such a trailing edge, comprising a non-metallic body having a curved base adapted for fitting over the edge and legs extending from the base for fitting against sides of the swinging closure adjacent the edge, said body containing notch structure disposed at its exterior surface at the center of said base, a layer of non-metallic material cooperatively joined to the exterior surface of said body, said layer extending from said notch structure along said base and at least an adjoining portion of one of the legs; and said layer presenting a different exterior appearance from that presented by the other of the legs.

7. The improvement set forth in claim 6 in which the exterior appearance presented by said other leg is that of said non-metallic body.

8. The improvement set forth in claim 6 in which said notch structure comprises an undercut at the center of the base.

9. The improvement set forth in claim 6 in which said layer comprises a transparent non-metallic material encapsulating a metallic foil.

10. The improvement set forth in claim 6 in which said notch structure is defined by a protuberance at the center of said base, said layer extending from one side of said protuberance, and including another layer of material cooperatively joined to the exterior surface of said body, said another layer extending from the other side of said notch structure along said base and at least an adjoining portion of the other of the legs, and the cooperative effect of said another layer and other leg presenting a different exterior appearance from that presented by the first-mentioned layer and one leg.

* * * * *